(12) United States Patent
Bhat et al.

(10) Patent No.: US 11,724,396 B2
(45) Date of Patent: Aug. 15, 2023

(54) GOAL-ORIENTED CONTROL OF A ROBOTIC ARM

(71) Applicants: Shanghai Flexiv Robotics Technology Co., Ltd., Shanghai (CN); Flexiv Ltd., Grand Cayman (KY)

(72) Inventors: Aditya Bhat, San Jose, CA (US); Shuyun Chung, San Jose, CA (US)

(73) Assignee: FLEXIV LTD., Grand Cayman (KY)

( * ) Notice: Subject to any disclaimer, the term of this patent is extended or adjusted under 35 U.S.C. 154(b) by 132 days.

(21) Appl. No.: 16/856,715

(22) Filed: Apr. 23, 2020

(65) Prior Publication Data

US 2021/0331316 A1  Oct. 28, 2021

(51) Int. Cl.
B25J 9/16 (2006.01)
(52) U.S. Cl.
CPC ........... *B25J 9/1666* (2013.01); *B25J 9/1661* (2013.01); *B25J 9/1669* (2013.01); *B25J 9/1697* (2013.01); *G05B 2219/40395* (2013.01)
(58) Field of Classification Search
CPC ........ B25J 9/0081; B25J 9/163; B25J 9/1661; B25J 9/1679; B25J 9/1697; G05B 19/42; G05B 2219/36184; G05B 2219/40391; G05B 2219/40395; G05B 2219/40116; G05B 2219/40477
See application file for complete search history.

(56) References Cited

U.S. PATENT DOCUMENTS

| | | | |
|---|---|---|---|
| 2013/0245824 A1 | 9/2013 | Barajas et al. | |
| 2019/0184570 A1* | 6/2019 | Yung | B25J 9/163 |
| 2019/0275671 A1 | 9/2019 | Natarajan et al. | |
| 2020/0030971 A1* | 1/2020 | Oleynik | A47J 36/321 |
| 2020/0156255 A1* | 5/2020 | Soltani Bozchalooi | G06V 10/242 |
| 2020/0198140 A1* | 6/2020 | Dupuis | G06F 17/18 |

FOREIGN PATENT DOCUMENTS

| | | |
|---|---|---|
| CN | 107214701 | 9/2017 |
| CN | 107343382 | 11/2017 |
| CN | 109876968 | 6/2019 |
| CN | 110598279 | 12/2019 |

OTHER PUBLICATIONS

Notification of Transmittal of International Search Report and Written Opinion for App. No. PCT/IB2021/053219 dated Jul. 27, 2021 (1 page).
International Search Report for App. No. PCT/IB2021/053219 dated Jul. 27, 2021 (4 pages).

* cited by examiner

*Primary Examiner* — Spencer D Patton
(74) *Attorney, Agent, or Firm* — K&L Gates LLP (57) ABSTRACT

Methods and systems for improved control of robotic arms are presented. In one embodiment, a method is presented that includes predefining a plurality of motion primitives, which may include one or more preconditions and effects. A target state for a plurality of workpieces may be determined as well as an initial state of the plurality of workpieces. A sequence of operations may be generated based on the preconditions and/or effects of the motion primitives, as well as the target state and the initial state. Executing the sequence of operations may be capable of changing the plurality of workpieces from the initial state to the target state.

17 Claims, 7 Drawing Sheets

GOAL-ORIENTED CONTROL OF A ROBOTIC ARM

BACKGROUND

The use of robotic arms has impacted many industries over the years. The robotic arms can vary in functionality, ranging from the ability to complete simple motions to performing complex tasks, and the same robotic arm may be used for multiple types of tasks. Such motions and tasks require programming of the robotic arm to perform the actions in a particular sequence depending on the specified motion or task.

SUMMARY

The present disclosure presents new and innovative systems and methods for controlling the movement of robotic arms. In a first aspect, a method for controlling a robotic arm to manipulate a plurality of workpieces is provided that includes predefining a plurality of motion primitives of the robotic arm, each of the plurality of motion primitives comprising one or more preconditions and one or more effects, and acquiring a target state of the plurality of workpieces. The method may further include acquiring an initial state of the plurality of workpieces and generating a sequence of operations based on the one or more preconditions and the one or more effects of the plurality of motion primitives, the target state and the initial state of the plurality of workpieces. The operations may be selected from the plurality of motion primitives and execution of the sequence of operations may be capable of changing the plurality of workpieces from the initial state to the target state.

In a second aspect according to the first aspect, acquiring the target state of the plurality of workpieces includes identifying a state of a prototype which corresponds to the target state of the plurality of workpieces.

In a third aspect according to the second aspect, the state of the prototype includes relative positions and relative connections between workpieces of the prototype.

In a fourth aspect according to any of the second and third aspects, the state of the prototype is identified with a vision acquisition device.

In a fifth aspect according to any of the first through fourth aspects, acquiring the initial state of the plurality of workpieces includes acquiring the initial state of the plurality of workpieces with a vision acquisition device.

In a sixth aspect according to any of the first through fifth aspects, the initial state of the plurality of workpieces comprises locations of the plurality of workpieces, and the sequence of operations is generated based on the locations of the plurality of workpieces.

In a seventh aspect according to any of the first through sixth aspects, the initial state of the plurality of workpieces includes relative positions and relative connections between the plurality of workpieces, and the sequence of operations is generated based on the relative positions and relative connections between the plurality of workpieces.

In an eighth aspect according to any of the first through seventh aspects, generating the sequence of the operations based on the one or more preconditions and the one or more effects of the plurality of motion primitives, the target state and the initial state of the plurality of workpieces includes generating the sequence of the operations in such a way that: every precondition of a start one of the operations meets the initial state of the plurality of workpieces and every effect of a last one of the operations meets the target state of the plurality of workpieces.

In a ninth aspect according to the eighth aspect, generating the sequence of the operations based on the one or more preconditions and the one or more effects of the plurality of motion primitives, the target state and the initial state of the plurality of workpieces further includes generating the sequence of the operations in such a way that: one or more effects of a previous one of the operations is capable of changing the plurality of workpieces from a previous state to a subsequent state. One or more preconditions of a subsequent one of the operations may meet the subsequent state.

In a tenth aspect according to any of the eighth and ninth aspects, the sequence of the operations is generated by using a graph traversal algorithm.

In an eleventh aspect according to any of the first through tenth aspects, the method further includes performing a collision check to determine whether the sequence of the operations is feasible and, responsive to determining that the sequence of the operations is not feasible, regenerating a new sequence of operations based on the one or more preconditions and the one or more effects of the plurality of motion primitives, the target state and the initial state of the plurality of workpieces.

In a twelfth aspect according to any of the first through eleventh aspect, the method further includes performing a collision check to determine whether the sequence of the operations is feasible and, responsive to determining that the sequence of the operations is feasible, executing the sequence of operations.

In a thirteenth aspect, a system for controlling a robotic arm is provided that includes a processor and a memory storing instructions which, when executed by the processor, cause the processor to perform a method for controlling the robotic arm to manipulate a plurality of workpieces. The method may include predefining a plurality of motion primitives of the robotic arm, each of the plurality of motion primitives comprising one or more preconditions and one or more effects, and acquiring a target state of the plurality of workpieces. The method may further include acquiring an initial state of the plurality of workpieces and generating a sequence of operations based on the one or more preconditions and the one or more effects of the plurality of motion primitives, the target state and the initial state of the plurality of workpieces. The operations may be selected from the plurality of motion primitives and execution of the sequence of operations may be capable of changing the plurality of workpieces from the initial state to the target state.

In a fourteenth aspect according to the thirteenth aspect, the system further includes a vision acquisition device. The state of the prototype may be identified with the vision acquisition device and the initial state of the plurality of workpieces may be identified with the vision acquisition device.

In a fifteenth aspect according to any of the thirteenth and fourteenth aspects, the initial state of the plurality of workpieces includes locations of the plurality of workpieces, and relative positions and relative connections between the plurality of workpieces. The sequence of operations may also be generated based on the locations of the plurality of workpieces, and the relative positions and the relative connections between the plurality of workpieces.

In a sixteenth aspect according to any of the thirteenth through fifteenth aspects, generating the sequence of the operations based on the one or more preconditions and the one or more effects of the plurality of motion primitives, the target state and the initial state of the plurality of workpieces includes generating the sequence of the operations in such a way that: every precondition of a start one of the operations meets the initial state of the plurality of workpieces; and every effect of a last one of the operations meets the target state of the plurality of workpieces; and one or more effects of a previous one of the operations is capable of changing the plurality of workpieces from a previous state to a subsequent state, wherein one or more preconditions of a subsequent one of the operations meet the subsequent state.

In a seventeenth aspect according to any of the thirteenth through sixteenth aspects, the method further includes performing collision check to determine whether the sequence of the operations is feasible and responsive to determining that the sequence of the operations is not feasible: regenerating a new sequence of operations based on the one or more preconditions and the one or more effects of the plurality of motion primitives, the target state and the initial state of the plurality of workpieces.

In an eighteenth aspect, a non-transitory, computer readable medium is provided storing instructions which, when executed by a processor, cause the processor to perform a method for controlling the robotic arm to manipulate a plurality of workpieces. The method may include predefining a plurality of motion primitives of the robotic arm, each of the plurality of motion primitives comprising one or more preconditions and one or more effects, and acquiring a target state of the plurality of workpieces. The method may also include acquiring an initial state of the plurality of workpieces and generating a sequence of operations based on the one or more preconditions and the one or more effects of the plurality of motion primitives, the target state and the initial state of the plurality of workpieces. The operations may be selected from the plurality of motion primitives and execution of the sequence of operations may be capable of changing the plurality of workpieces from the initial state to the target state.

In a nineteenth aspect according to the eighteenth aspect, generating the sequence of the operations based on the one or more preconditions and the one or more effects of the plurality of motion primitives, the target state and the initial state of the plurality of workpieces includes generating the sequence of the operations in such a way that every precondition of a start one of the operations meets the initial state of the plurality of workpieces; and every effect of a last one of the operations meets the target state of the plurality of workpieces; and one or more effects of a previous one of the operations is capable of changing the plurality of workpieces from a previous state to a subsequent state, wherein one or more preconditions of a subsequent one of the operations meet the subsequent state.

In a twentieth aspect according to any of the eighteenth and nineteenth aspects, the state of the prototype includes relative positions and relative connections between workpieces of the prototype. The initial state of the plurality of workpieces may also include locations of the plurality of workpieces, and relative positions and relative connections between the plurality of workpieces. The sequence of operations may also be generated based on the relative positions and relative connections between workpieces of the prototype, the locations of the plurality of workpieces, and the relative positions and the relative connections between the plurality of workpieces.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

When a robotic arm is programmed to perform a task, the actions performed by the robot and the sequence in which the robotic arm executes the actions may be extremely important to the overall performance of the task. For example, when constructing an assembly from multiple parts, the order in which the parts are connected may be important for ensuring proper operation of the assembly. Correct performance of tasks by robotic arms may typically require operators to manually program particular actions and the particular sequence for the actions depending on the specified task. However, a task may not always be performed identically each time. For example, changes in position for the parts may alter the specific actions and/or sequence in which the actions are performed (e.g., speed, location, size, shape, etc.). Therefore, the robotic arm may have to be programmed with every potential sequence of actions that may be required to perform the task in multiple different scenarios and/or may have to be programmed to account for variables which may change.

Proper performance of the robotic arm may also require an operator in certain instances. The operator may monitor conditions within the environment in which the robotic arm is placed in order to ensure that the robotic arm is not impeded in its completion of the task. As each task may be unique, the operator may be required to constantly input different commands to safeguard against potential mistakes by the robotic arm. This can be incredibly difficult and may require numerous operators to regularly supervise operations and vary the coding of the robotic arm. Additionally, the operator may need to manually construct or otherwise program the series of actions that the robotic arm must perform in order to add a new function to the robotic arm (e.g., to process a new workpiece) and/or to account for a new variable (e.g., a new arrangement of workpieces) that may alter the sequence of actions to be performed. Adding functionality in this way can be unduly tedious, as the operator may be required to specify which actions have to be performed by the robotic arm. Therefore, there exists a need to enable a robotic arm to accurately and efficiently construct a series of actions to accomplish new tasks and/or to respond to new environmental variables.

One solution to this problem is to configure the robotic arm to automatically generate a sequence of operations in order to perform a specified task. These operations may be selected from predefined motion primitives which specify the actions the robot is capable of taking. Rather than requiring an operator to repeatedly construct actions for the robotic arm to execute in performing the task, the robotic arm may be able to select a series of motion primitives to generate the sequence of operations in order to perform the specified task. The robotic arm may take into account variables prior to selecting motion primitives. For example, the robotic arm may be communicatively coupled to a visual sensory system that can identify information regarding the surrounding environment and the workpieces that may be handled by the robotic arm. By taking into account different variables such as the information identified by the visual sensory system and information regarding the current state of the robotic arm, the robotic arm can select an efficient series of motion primitives to accomplish the goal.

Figure 1:
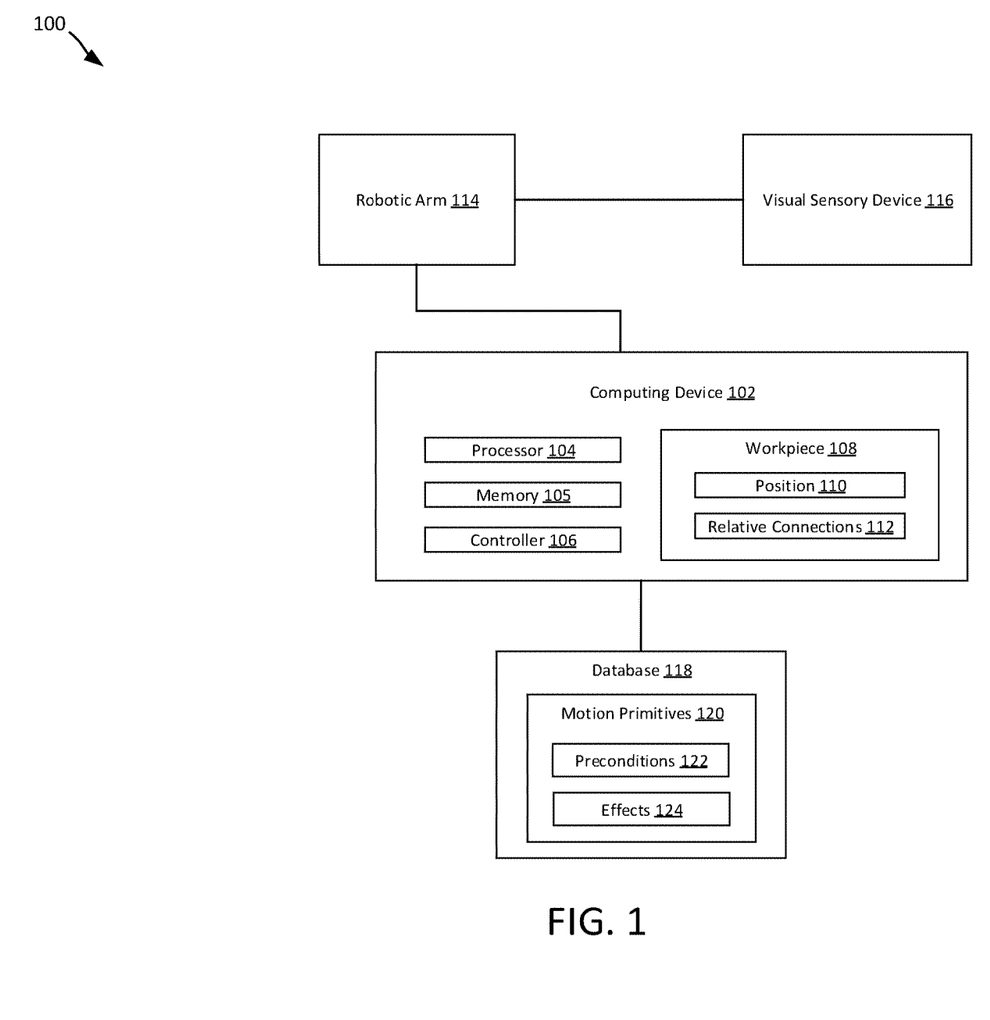
FIG. 1 illustrates a system according to an exemplary embodiment of the present disclosure.

FIG. 1 illustrates a system 100 according to an exemplary embodiment of the present disclosure. The system 100 may be configured to analyze information regarding an environment to select a series of motion primitives to generate a sequence of operations to perform a specified task. The system 100 includes a computing device 102, which may be configured to process information about one or more workpieces and the surrounding environment prior to selecting motion primitives to be performed.

The computing device 102 includes a processor 104, a memory 105, and a controller 106. The computing device 102 may be configured to perform a variety of functions. The processor 104 and the memory 105 may be configured to perform one or more of the functions of the computing device 102. For example, the memory 105 may store instructions which, when executed by the processor 104, cause the processor 104 to perform one or more operational features of the computing device 102. The memory 105 may also store information from the performance of the system 100, including information of the environment and a history of tasks completed by the system 100. The computing device 102 may be configured to detect and process information regarding an environment. For example, the computing device 102 and the visual sensory device 116 may constitute a visual sensory system which may identify one or more workpieces 108 in the environment and may identify information regarding the workpieces 108, such as positions of the workpieces 108 and relative connections between the workpieces 108. For example, the workpieces 108 can have position information that instructs the computing device of the workpieces' 108 current orientation and location relative to one another. One workpiece may be connected to other workpieces, and the connections between workpieces 108 can also be identified by the visual sensory system such that the system 100 may know whether the workpieces 108 are connected to each other and the connection types between the workpieces 108. Other information regarding the workpieces 108 (e.g., shapes, sizes, colors) may be input by an operator of the system 100 and stored in the memory 105 such that the visual sensory system can identify each workpiece 108.

The information of the workpieces 108 can be gathered through a visual sensory device 116. The visual sensory device 116 may include one or more cameras or other visual sensors. Data (e.g., image or other visual data) from the visual sensory device 116 may be analyzed to identify workpieces 108 and related information (e.g., positions 110 and/or relative connections 112). The visual sensory device 116 may be communicatively coupled to the computing device 102 to send information about the workpieces 108 to the computing device 102 for processing by the processor 104. For example, the computing device 102 may receive image data from the visual sensory device 116 and may analyze the image data to identify the workpiece 108 and related information. The visual sensory device 116 may also be attached to the robotic arm 114 for an accurate determination of positions of the workpieces 108 in relation to the robotic arm 114. Additionally or alternatively, certain related information for the workpiece 108 may be specified by an operator (e.g., an operator specifying the task which the robotic arm 114 is being programmed to perform).

The robotic arm 114 may be configured to perform a variety of tasks depending on the motion primitives 120 selected by the computing device 102. Motion primitives 120 may be stored in a database 118, which may be communicatively coupled to the computing device 102 and the robotic arm 114. The database 118 may be configured to receive new motion primitives 120 created by a user or transmitted from other system or device. The motion primitives 120 stored in the database 118 may specify all or at least part of actions that the robotic arm 114 is capable of performing. Each of the motion primitives 120 may contain one or more preconditions 122 that are required prior to the motion primitive 120 being carried out by the robotic arm 114. Each of the motion primitives 120 may also contain one or more effects 124 that indicate the consequent changes to the state of workpieces 108 and the robotic arm 114 brought by completing the motion primitive 120. For instance, one exemplary motion primitive may be opening the gripper. Its preconditions 122 may include that the gripper is closed, and its effect 124 may include that the object which was held by the gripper is no longer held by the gripper. In certain implementations, the robotic arm 114 may receive commands from the computing device 102. For example, the computing device 102 may provide commands to the robotic arm 114 based on the motion primitives 120 selected from the database. In further implementations, the commands may be transmitted from the computing device 102 to the robotic arm 114 via the controller 106, which may be communicatively coupled to the robotic arm 114.

Figure 2A:
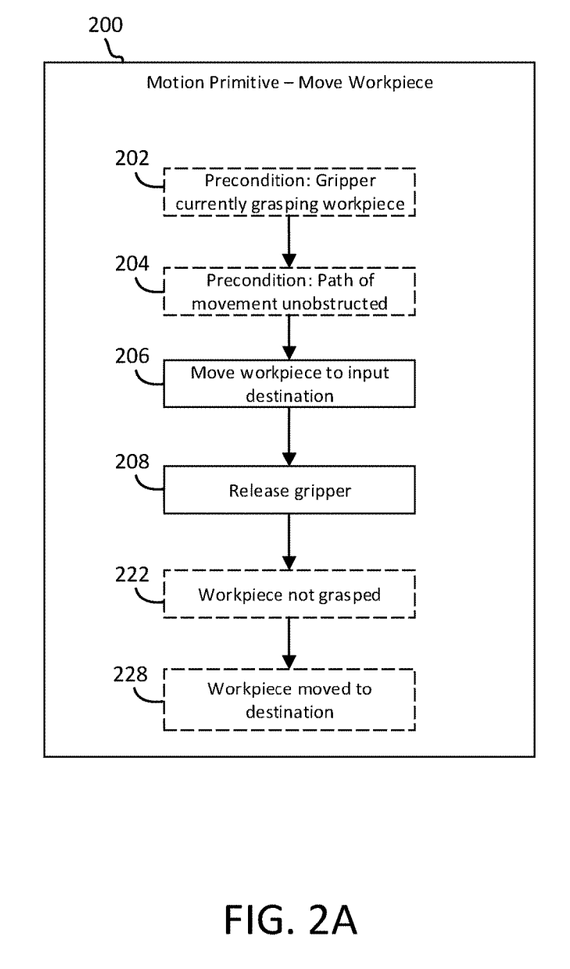
FIGS. 2A-2B illustrate motion primitives according to exemplary embodiments of the present disclosure.
Figure 2B:
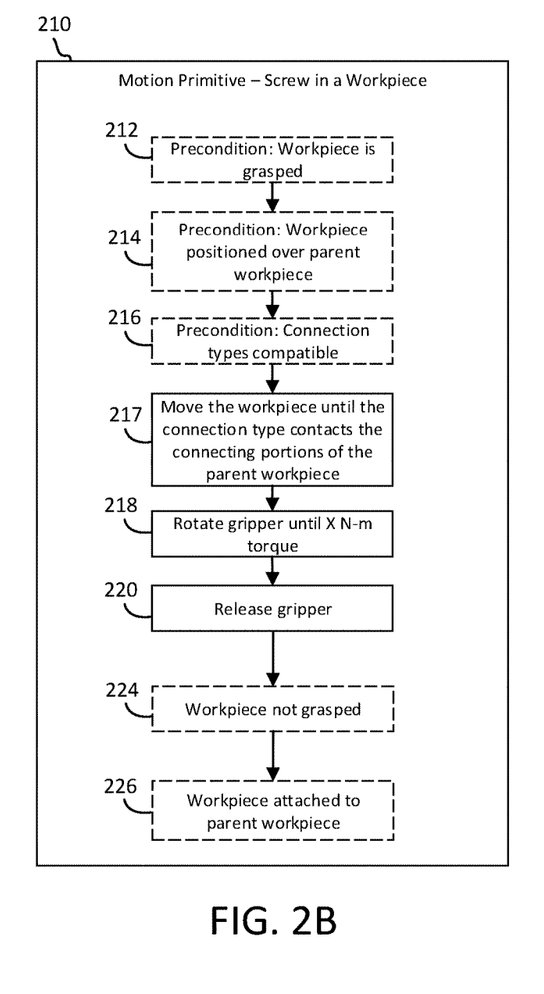

FIGS. 2A and 2B depict exemplary motion primitives 200, 210 that may be used to control the operation of a robotic arm. The motion primitive 200 may be performed to move a workpiece and the motion primitive 210 may be performed to screw in a workpiece. In particular, the motion primitives 200, 210 may be exemplary implementations of motion primitives 120 stored in the database 118 and may be utilized by the computing device 102 to generate a sequence of operations to control the motion of the robotic arm 114. The motion primitives 200, 210 include preconditions 202, 204, 212, 214, 216, operations 206, 208, 218, 220, and effects 222, 224, 226, 228. For example, the motion primitive 200 contains two preconditions 202, 204. The preconditions 202, 204 may specify one or more conditions or statuses that must be fulfilled before the motion primitive 200 can be performed. In particular, the precondition 202 may require that the robotic arm's 114 gripper is currently grasping a workpiece 108 and the precondition 204 may require that a path of movement (e.g., a path of movement for the workpiece 108) is unobstructed. The computing device 102 may be configured to determine whether the preconditions 202, 204 are met. For example, in order to determine whether the preconditions 202, 204 are met, the visual sensory device 116 may determine an initial state of the workpiece 108 by collecting and sending image data of, e.g., the workpiece 108, the path of movement, and/or the robotic arm's 114 gripper to the computing device 102. As another example, the system 100 may determine whether the precondition 202 is met using sensors (e.g., force sensors) in a gripper or in joints of the robotic arm 114. As a specific example, the computing device 102 may determine that the gripper is grasping the workpiece 108 if a grip force exceeds a predetermined threshold. In another embodiment, the computing device 102 may not require the input of data from the visual sensory system 116 or the sensors of the robotic arm 114. In such embodiments, the computing device 102 may rely on information stored in the memory 105. For example, operations performed by the system 100 may be stored in the memory 105. The computing device 102 may access the memory 105 to determine if a precondition 202, 204 is met based on previously performed operations. In still further implementations, the preconditions 202, 204 may be verified based on the effects of earlier motion primitives.

If the computing device 102 determines that all preconditions 122 are met, performance of the operations 206, 208 may be permitted. Motion primitive 200 contains two operations 206, 208. The performance of operations 206, 208 may be required to complete motion primitive 200. In motion primitive 200, the computing device 102 may permit the performance of operation 206 of moving the workpiece 108 to a particular destination. Operation 208 may then be performed to release the gripper of the robotic arm 114. As the workpiece 108 has been moved to the desired destination through operation 206, the computing device 102 may instruct the robotic arm 114 to release the workpiece 108 by releasing the gripper. After completing the motion primitive 200, one or more effects 222, 228 may be enacted. In particular, after completing motion primitive 200, the workpiece 108 is not grasped, as indicated by the effect 222, and the workpiece 108 is moved to the particular destination, as indicated by the effect 228.

FIG. 2B depicts a second exemplary motion primitive 210. Motion primitive 210 demonstrates the operations 217, 218, 220 that may be executed by the robotic arm 114 to screw in a workpiece 108 (e.g., to mount the workpiece 108 using a threaded connection). Motion primitive 210 contains three preconditions 212, 214, 216. All three preconditions 212, 214, 216 may be required to be fulfilled before the operations 217, 218, 220 can be executed. In particular, the precondition 212 may require that the robotic arm's 114 gripper is currently grasping a workpiece 108. Precondition 214 requires that the workpiece 108 is positioned over a separate parent workpiece. Precondition 216 requires that the connection types of the workpieces 108 (e.g., the workpiece 108 gripped by the robotic arm 114 and the parent workpiece) are compatible. In order to determine whether the precondition 216 is met, the visual sensory device 116 may collect and send image data of the workpieces 108 to the computing device 102. Workpieces 108 may have a particular connection type. For example, a workpiece may have a connection type such as a male and/or female connector (e.g., threaded/screw connection, plug/outlet connection, clamps, etc.). As workpieces 108 may have a particular connection type, the computing device 102 may need to analyze the image data sent from the visual sensory device 116 to determine the particular connection type of each workpiece 108. To meet precondition 216, the computing device 102 may use the information of the connection types of each workpiece 108 to determine if the workpieces 108 are compatible. For example, compatible workpieces 108 may include a workpiece 108 with a threaded male connector and a parent workpiece with a threaded opening, or female connector. An example of incompatible workpieces 108 may include a workpiece 108 with a threaded male connector and a parent workpiece with a threaded male connector. The connection type of at least some of the workpieces 108 may be inputted by an operator of the robotic arm 114 and stored in the memory 105 of the computing device 102 in advance instead of using the visual sensory device 116.

If the computing device 102 determines that the preconditions 212, 214, 216 of motion primitive 210 are met, performance of operations 217, 218, 220 may be permitted. Due to the preconditions 212, 214, 216 being met, the robotic arm 114 may be gripping the workpiece 108 and the workpiece 108 may be positioned over a parent workpiece that the relative connections 112 are aligned and compatible. Motion primitive 210 contains three operations 217, 218, 220. For example, the performance of operations 217, 218, 220 may be required to complete motion primitive 210. In particular, the operation 217 may require that the robotic arm 114 move the workpiece 108 to contact the parent workpiece. For example, the computing device 102 may instruct the robotic arm 114 to move the gripped workpiece 108 towards the parent workpiece until the connecting portions of both workpieces are in contact. Operation 218 may include rotating the gripper of the robotic arm 114 until a threshold torque level is reached, screwing the workpiece 108 into the parent workpiece. Operation 220 may include releasing the workpiece 108 by the gripper of the robotic arm 114. After completing the motion primitive 210, one or more effects 224, 226 may be in place. In particular, after completing motion primitive 200, the workpiece 108 is not grasped, as indicated by the effect 222, and the workpiece 108 is mounted on the parent workpiece, as indicated by the effect 226.

In certain implementations, one or both of the preconditions 202, 204, 212, 214, 216 and the effects 222, 224, 226, 228 may be stored as logical expressions. For example, the preconditions 202, 212 may be stored as WorkpieceGrasped, the precondition 204 may be stored as NOT PathObstructed, and the precondition 214 may be stored as Workpiece1 OVER Workpiece2. As another example, the effect 228 of motion primitive 200 may be stored as WorkpieceMoved and the effect 226 of motion primitive 210 may be stored as Workpiece1 ON Workpiece2.

Figure 3:
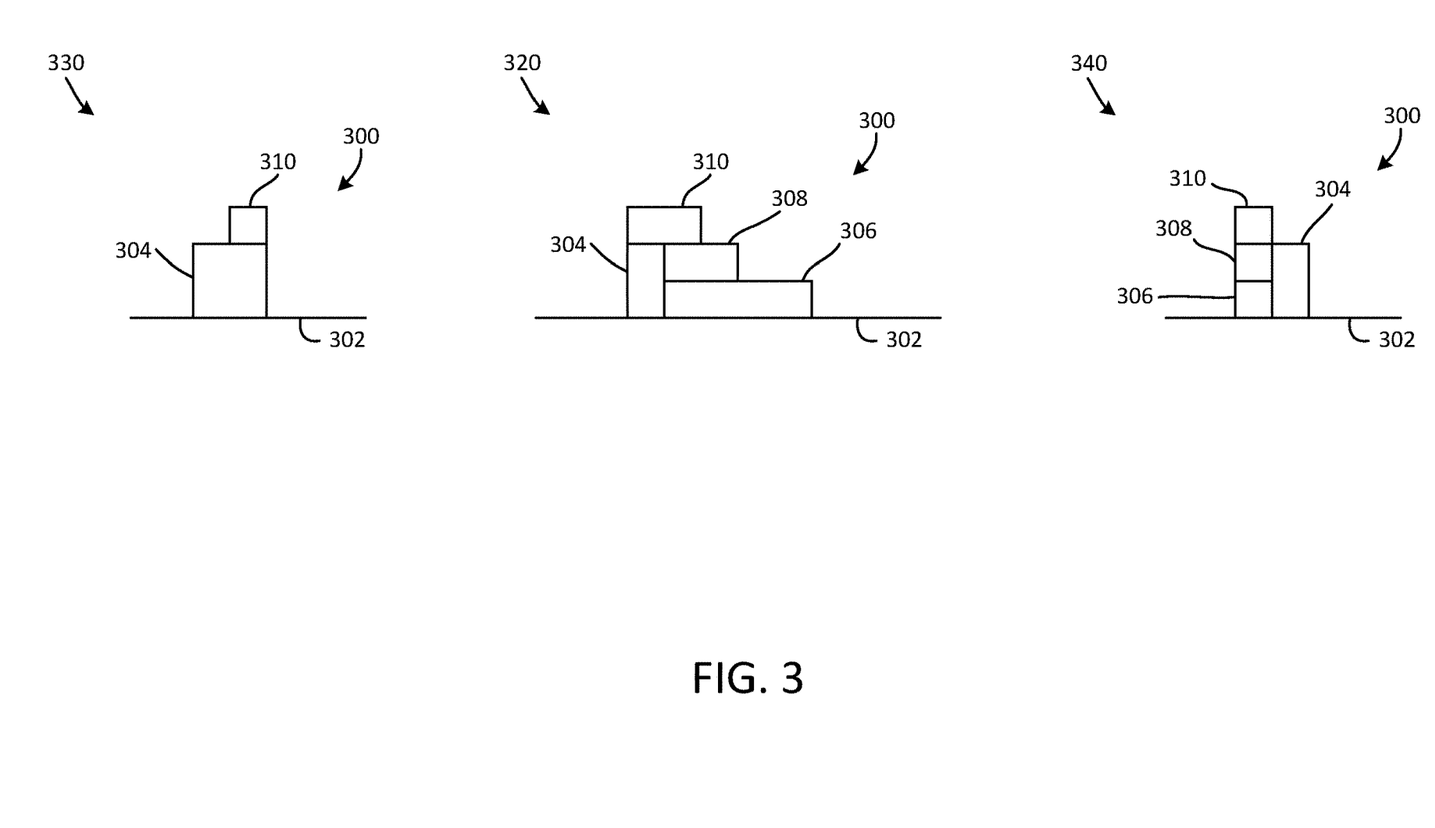
FIG. 3 illustrates views of a workpiece arrangement according to an exemplary embodiment of the present disclosure.

FIG. 3 depicts views 320, 330, 340 of a workpiece arrangement 300 according to an exemplary embodiment of the present disclosure. The view 320 may be a frontal view of the workpiece arrangement 300 and the views 330, 340 may respectively be side views to the left and right of the view 320. The workpiece arrangement 300 includes workpieces 304, 306, 308, 310 of different sizes and dimensions arranged on a base 302. In particular, the workpieces 304, 306 are positioned directly on the base 302 (e.g., the base 302 is the "parent" of the workpieces 304, 306). The workpiece 308 is positioned on top of the workpiece 306 (e.g., the workpiece 306 is the parent of the workpiece 308) and the workpiece 310 is positioned on the workpieces 304, 308 (e.g., the workpieces 304, 308 are both parents of the workpiece 310). The workpieces 304, 306, 308, 310 and the base 302 may be fitted or otherwise attached together (e.g., via clasps, insertion mounts and the like) or may be positioned as depicted without being attached together. In certain instances, the workpiece arrangement 300 may be represented as a logical expression, such as (workpiece 306 ON base 302) && (workpiece 304 ON base 302) && (workpiece 308 ON workpiece 306) && (workpiece 310 ON workpiece 308) && (workpiece 310 ON workpiece 304).

Figure 4:
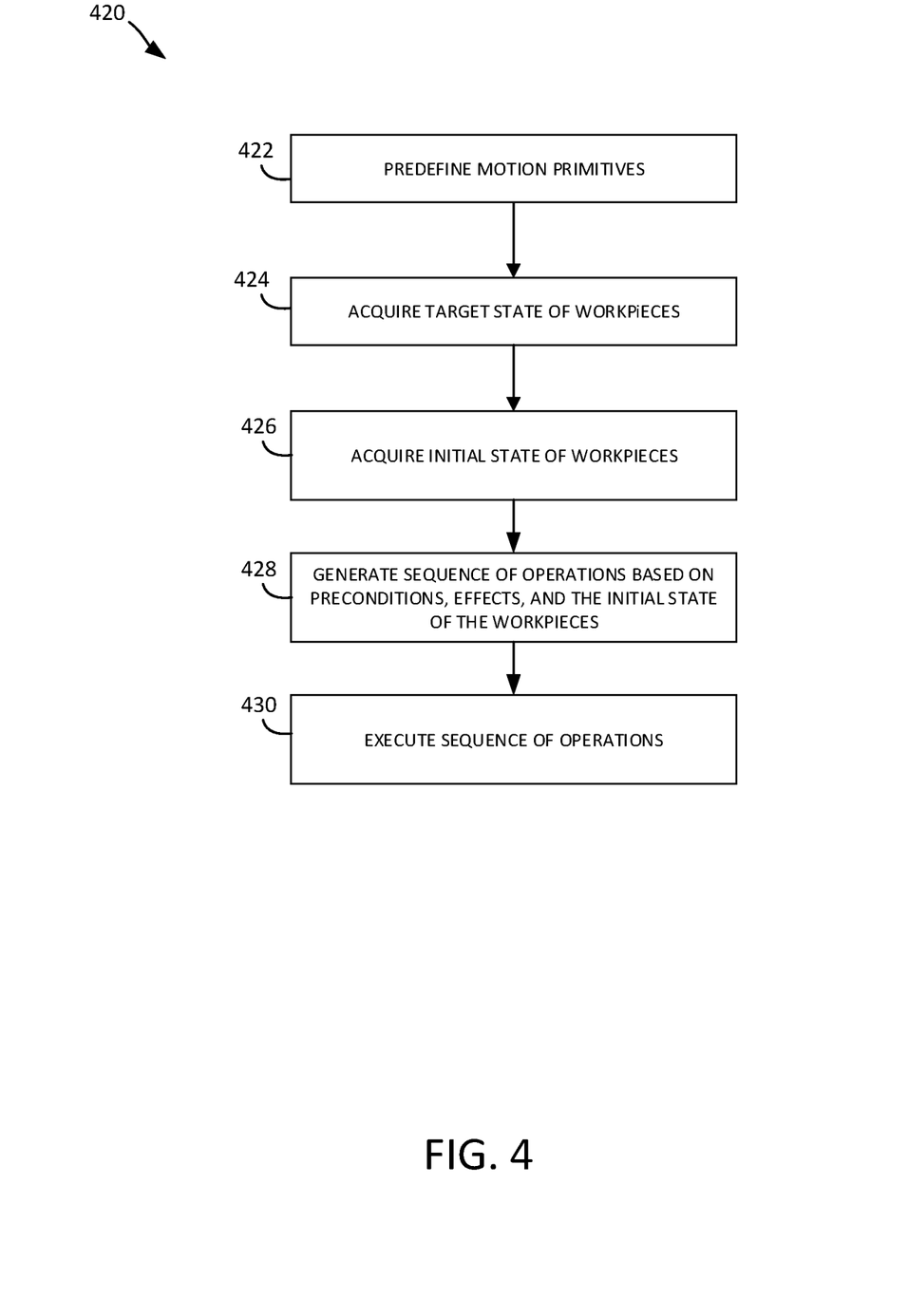
FIG. 4 illustrates a method for assembling and disassembling workpieces according to an exemplary embodiment of the present disclosure.

FIG. 4 demonstrates a method 420 according to an exemplary embodiment of the system 100. The method 420 may be performed to control a robotic arm 114 to perform a desired task. For example, the method 420 may be performed to accomplish a goal or process with regards to the assembly or disassembly of workpieces through predefined motion primitives. The method 420 may be implemented on a computer system, such as the system 100. The method may also be implemented by a set of instructions stored on a computer readable medium that, when executed by a processor, cause the computer system to perform the method 420. For example, all or part of the method 420 may be implemented by the processor 104 and the memory 105. Although the examples below are described with reference to the flowchart illustrated in FIG. 4, many other methods of performing acts associated with FIG. 4 may be used. For example, the order of some of the blocks may be changed, certain blocks may be combined with other blocks, one or more of the blocks may be repeated, and some of the blocks described may be optional.

The method 420 may begin with predefining motion primitives 120 (block 422). The motion primitives 120 may be stored in the memory 105 of the system 100. The motion primitives 120 may be accessed by the computing device 102 in order to accomplish a goal or desired process. The motion primitives 120 may correspond to operations to be performed by the system 100. As explained above, the motion primitives 120 may include preconditions 122 and/or effects 124. Creating motion primitives is discussed in greater detail in connection with the method 500 below.

The system 100 may then acquire a target state of the workpieces 108 (block 424). For example, the goal or desired process may include the movement, reordering, or alteration of one or more workpieces 108 to a target state. The target state may include positions and connections of the one or more workpieces 108 with respect to other workpieces 108. The target state may be inputted directly by an operator. For example, the operator may enter that workpieces 108 need to be moved to a particular location and/or positioned with particular orientations relative to one another. Alternatively, the target state of a workpiece may be acquired through the use of the visual sensory device 116. For example, the system 100 may be presented with a prototype or particular arrangement of workpieces 108 which the system 100 must replicate. The computing device 102 may instruct the visual sensory device 116 to acquire image data of the workpieces 108, including position 110 and/or relative connection 112. The visual sensory device 116 may send the image data to the computing device 102 for processing by the processor 104. The processor 104 may determine the target states for each workpiece 108. The information regarding the target states may be stored in the memory 105. In one particular example, the target state of the workpieces 108 may be the workpiece arrangement 300.

Data regarding initial states of the workpieces 108 may then be determined (block 426). For example, after acquiring the target states of the workpieces 108, the system 100 may be presented with workpieces 108 which are in initial states. Although the goal may be to move or orient the workpieces 108 in a particular manner corresponding to the target state, the workpieces 108 may begin in a location and position 110 and/or orientation that is different than the target state. The computing device 102 may receive the data regarding the initial states of the workpieces 108 through use of the visual sensory device 116. For example, the visual sensory device 116 may acquire image data of the current set up of the workpieces 108, denoting the initial states of the workpieces 108. The visual sensory device 116 may send the image data of the initial states to the computing device 102. The computing device 102 may process the image data using the processor 104. Alternatively, the initial states of the workpieces 108 may be entered by an operator. In an example where the target state is the workpiece arrangement 300, the initial state may indicate that the workpieces 304, 306, 308, 310 are all connected to the base 302 (e.g., at locations spread out from one another). In certain instances, the initial states may include orientations of the workpieces 108 relative to one another. Continuing the previous example, the initial state may indicate that the workpieces 310, 308 are perpendicular to the workpiece 306 (rather than parallel as in the workpiece arrangement 300) and that the workpiece 304 is parallel to the workpiece 306 (rather than perpendicular as in the workpiece arrangement 300).

Based on the initial states and target states of the workpieces 108, the system 100 may generate a sequence of corresponding operations to accomplish a goal and reach the target states of the workpieces 108 (block 428). The sequence of operations may be further based on motion primitives 120, preconditions 122, and effects 124. For example, the computing device 102 may select motion primitives 120 based on the target states of the workpieces 108 and the initial states of the workpieces. In particular, the computing device 102 may select the corresponding operations such that the initial state meets the preconditions 122 of at least the first operation and such that the end result of the effects 124 of the sequence of operations meets the target state of the workpieces 108. In certain implementations, the effects 124 of completing a first operation may result in the fulfillment of a precondition 122 for a later, second operation. In particular, completing the first operation may transition the workpieces 108 from a previous state to a subsequent state, where the previous state does not comply with at least one of the preconditions 122 of the second operation and the subsequent state complies with every precondition 122 of the second operation. In certain implementations, the sequence of operations may be identified at least in part using a graph traversal algorithm, such as the A* search algorithm or the like. In particular, such a search may be performed on a database 118 of motion primitives 120 to identify the sequence of operations. Continuing the example where the target state for the workpieces 108 is the workpiece arrangement 300, the sequence of operations may include (1) picking up the workpiece 304 and placing it on the base 302 next to the workpiece 306, (2) picking up the workpiece 308 and placing it on the workpiece 306, and (3) picking up the workpiece 310 and placing it on the workpieces 304, 308.

The computing device 102 may execute the sequence of operations (block 430). For example, the computing device 102 may execute the operations in an order specified by the sequence of operations (e.g., by executing one or more motion steps of motion primitives included in the sequence of operations). In certain instances, prior to executing the sequence of operations, the computing device 102 may perform a collision check analysis for the feasibility of successfully completing the sequence of operations. For example, the computing device 102 may analyze the sequence of operations to determine whether particular workpieces are not accessible (e.g., because other workpieces or equipment block the robotic arm 114 from accessing the workpieces 108). As another example, the computing device 102 may analyze the sequence of operations to determine whether performing particular operations (e.g. moving workpieces 108) will cause the workpieces 108 to collide with other equipment or workpieces. If the computing device 102 determines that a collision is likely, or that the sequence of operations is otherwise not feasible, a new sequence of operations may be generated (e.g., by repeating block 428).

Figure 5:
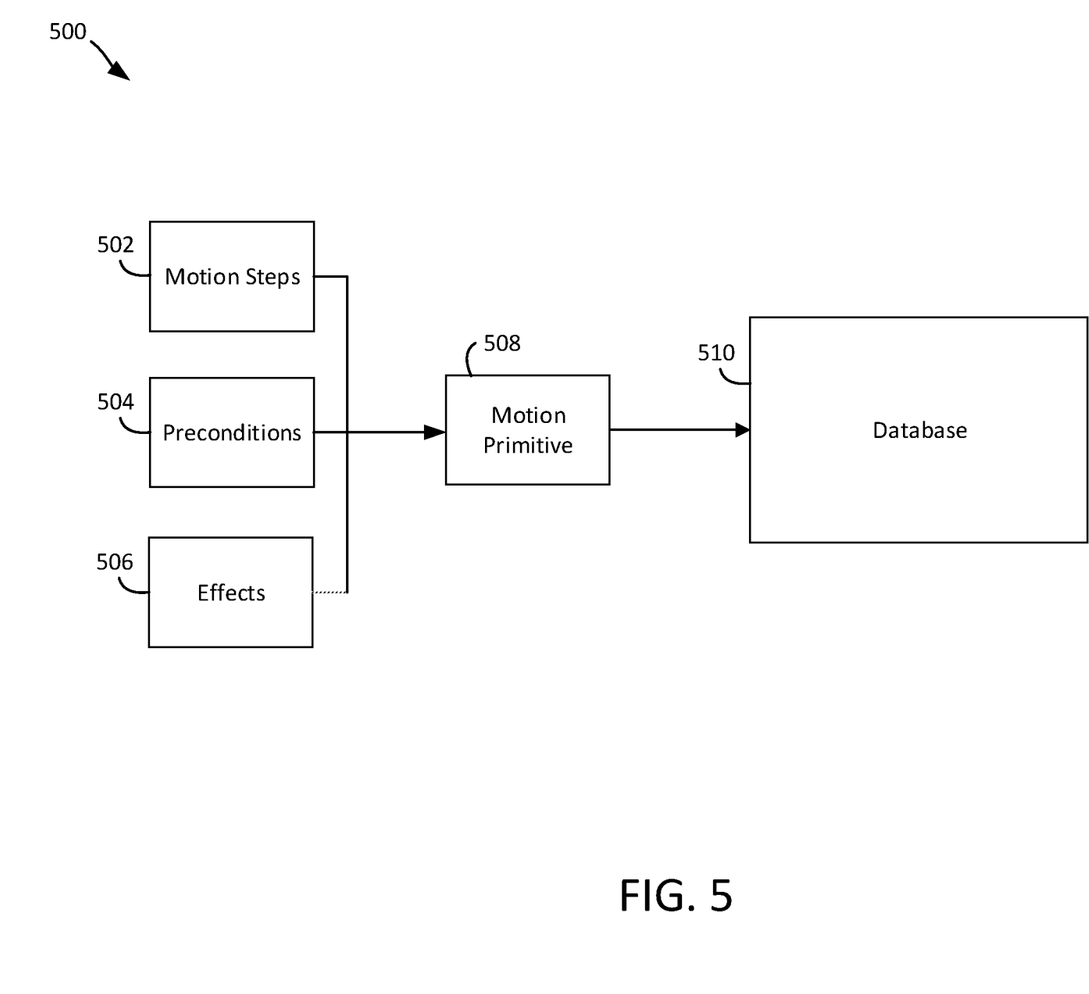
FIG. 5 illustrates a method for creating and storing motion primitives according to an exemplary embodiment of the present disclosure.

FIG. 5 demonstrates a method 500 according to an exemplary embodiment of the system 100. The method 500 may be performed to program and store a motion primitive 508. For example, the method 500 may be performed to store motion primitives in the database 118 for use in the method 420 (e.g., during block 422). The method 500 may be implemented on a computer system, such as the system 100. The method 500 may also be implemented by a set of instructions stored on a computer readable medium that, when executed by a processor, cause the computer system to perform the method 500. For example, all or part of the method 500 may be implemented by the processor 104 and the memory 105.

The method 500 may begin with receiving one or more motion steps 502. For example, the computing device 102 may receive one or more motion steps 502 that are to be performed when executing the motion primitive 508. The motion steps 502 may specify actions and/or movements performed by the robotic arm 114. The method 500 may also include receiving one or more preconditions 504 and one or more effects 506. The preconditions 504 and the effects 506 may be received in connection with the motion steps 502. For example, the preconditions 504, effects 506, and/or motion steps 502 may be received from a user. As a specific example, the user may use the computing device 102 or another computing device to create and/or enter the motion steps 502, the preconditions 504 and the effects 506.

A motion primitive 508 may then be created. For example, the computing device 102 may create a motion primitive 508 that includes the motion steps 502, the preconditions 504 and the effects 506. The motion primitive 508 may then store the motion primitive 508 in the database 510, which may be an exemplary implementation of the database 118. For example, the computing device 102 may transmit the motion primitive 508 to the database 510 for storage. Additionally or alternative, the motion primitive 508 may be stored in a database 510 implemented within the memory 105 of the computing device 102.

Figure 6:
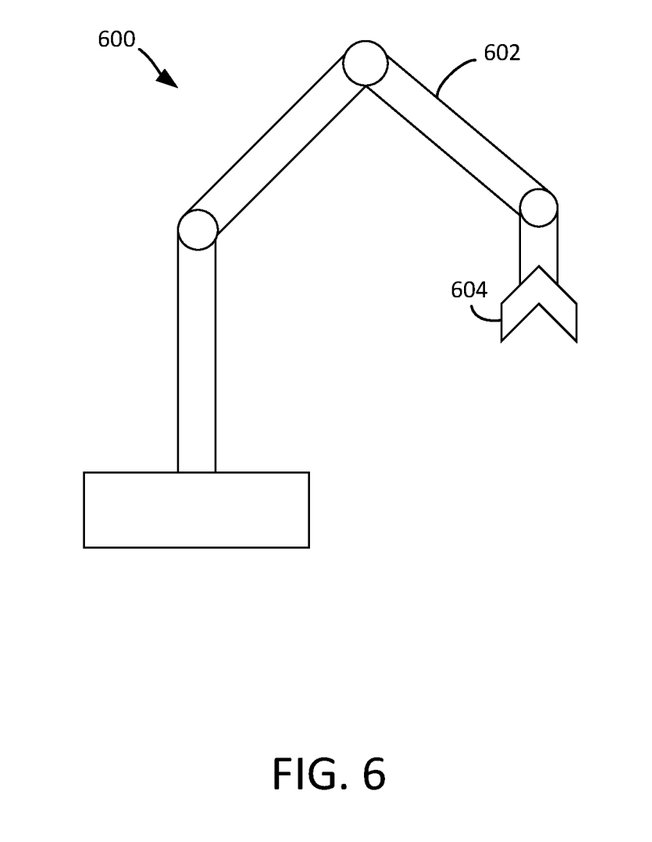
FIG. 6 illustrates a robotic arm according to an exemplary embodiment of the present disclosure.

FIG. 6 depicts an exemplary robotic arm 600. The robotic arm 600 may be communicatively coupled with the system 100 and may be an exemplary implementation of the robotic 114. The robotic arm 600 may include multiple robotic arm segments 602 and an end effector 604. The end effector 604 may include a gripper, in which one or more sensors (e.g., force and/or torque sensors) may be installed. For example, the end effector 604 may be a robot gripper that utilizes the sensor(s) to detect changes in force and/or torque as described above in connection with operations 217, 218. In other examples, the end effector 604 may be any other suitable tool that utilizes any suitable sensor(s) as described in the present disclosure. In some embodiments, the sensor (s) to detect changes in force and/or torque may be alternatively or additionally be installed in the joint actuator of the robotic arm segments 602.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for controlling a robotic arm to manipulate a plurality of workpieces, comprising:
predefining a plurality of motion primitives of the robotic arm, each of the plurality of motion primitives comprising one or more preconditions and one or more effects;
acquiring a target state of the plurality of workpieces, wherein the target state comprises relative connections between at least a subset of the plurality of workpieces;
acquiring an initial state of the plurality of workpieces, wherein the initial state comprises connection types for at least the subset of the plurality of workpieces;
determining if the connection types for at least the subset of the plurality of workpieces are compatible with each other before performance of operations; and
generating a sequence of operations based on the one or more preconditions and the one or more effects of the plurality of motion primitives, the target state and the initial state of the plurality of workpieces, wherein generating the sequence of the operations is performed in a way that every precondition of a starting one of the operations meets the initial state of the plurality of workpieces and every effect of a last one of the operations meets the target state of the plurality of workpieces;
wherein the initial state of the plurality of workpieces further comprises relative positions and relative connections between the plurality of workpieces, and the sequence of operations is generated based on the relative positions and the relative connections between the plurality of workpieces in the initial state;
wherein the operations are selected from the plurality of motion primitives;
wherein execution of the sequence of operations is capable of changing the plurality of workpieces from the initial state to the target state, including connecting at least the subset of the plurality of workpieces according to the relative connections in the target state and the connection types.

2. The method of claim 1, wherein the acquiring the target state of the plurality of workpieces comprises:
identifying a state of a prototype which corresponds to the target state of the plurality of workpieces.

3. The method of claim 2, wherein the state of the prototype comprises relative positions and relative connections between workpieces of the prototype.

4. The method of claim 2, wherein the state of the prototype is identified with a vision acquisition device.

5. The method of claim 1, wherein acquiring the initial state of the plurality of workpieces comprises acquiring the initial state of the plurality of workpieces with a vision acquisition device.

6. The method of claim 1, wherein the initial state of the plurality of workpieces comprises locations of the plurality of workpieces, and the sequence of operations is generated based on the locations of the plurality of workpieces.

7. The method of claim 1, wherein the generating the sequence of the operations based on the one or more preconditions and the one or more effects of the plurality of motion primitives, the target state, and the initial state of the plurality of workpieces further comprises:
generating the sequence of the operations in such a way that: one or more effects of a previous one of the operations is capable of changing the plurality of workpieces from a previous state to a subsequent state, wherein one or more preconditions of a subsequent one of the operations meet the subsequent state.

8. The method of claim 1, wherein the sequence of the operations is generated by using a graph traversal algorithm.

9. The method of claim 1, further comprising:
performing a collision check to determine whether the sequence of the operations is feasible; and
responsive to determining that the sequence of the operations is not feasible: regenerating a new sequence of operations based on the one or more preconditions and the one or more effects of the plurality of motion primitives, the target state, and the initial state of the plurality of workpieces.

10. The method of claim 1, further comprising:
performing collision check to determine whether the sequence of the operations is feasible; and
responsive to determining that the sequence of the operations is feasible: executing the sequence of the operations.

11. A system for controlling a robotic arm, comprising:
a processor; and
a memory storing instructions which, when executed by the processor, cause the processor to perform a method for controlling the robotic arm to manipulate a plurality of workpieces, wherein the method comprises:
predefining a plurality of motion primitives of the robotic arm, each of the plurality of motion primitives comprising one or more preconditions and one or more effects;
acquiring a target state of the plurality of workpieces, wherein the target state comprises relative connections between at least a subset of the plurality of workpieces;
acquiring an initial state of the plurality of workpieces, wherein the initial state comprises connection types for at least the subset of the plurality of workpieces;
determining if the connection types for at least the subset of the plurality of workpieces are compatible with each other before performance of operations; and
generating a sequence of operations based on the one or more preconditions and the one or more effects of the plurality of motion primitives, the target state and the initial state of the plurality of workpieces, wherein generating the sequence of the operations is performed in a way that every precondition of a starting one of the operations meets the initial state of the plurality of workpieces and every effect of a last one of the operations meets the target state of the plurality of workpieces;
wherein the initial state of the plurality of workpieces further comprises locations of the plurality of workpieces, and relative positions and relative connections between the plurality of workpieces;
wherein, the sequence of operations is generated based on the locations of the plurality of workpieces, and the relative positions and the relative connections between the plurality of workpieces in the initial state;
wherein the operations are selected from the plurality of motion primitives;
wherein execution of the sequence of operations is capable of changing the plurality of workpieces from the initial state to the target state, including connecting at least the subset of the plurality of workpieces according to the relative connections and the connection types.

12. The system of claim 11, further comprising a vision acquisition device, wherein
a state of a prototype corresponding to the target state is identified with the vision acquisition device; and
the initial state of the plurality of workpieces is identified with the vision acquisition device.

13. The system of claim 11, wherein the generating the sequence of the operations based on the one or more preconditions and the one or more effects of the plurality of motion primitives, the target state, and the initial state of the plurality of workpieces comprises:
generating the sequence of the operations in such a way that:
every precondition of a start one of the operations meets the initial state of the plurality of workpieces; and every effect of a last one of the operations meets the target state of the plurality of workpieces; and
one or more effects of a previous one of the operations is capable of changing the plurality of workpieces from a previous state to a subsequent state, wherein one or more preconditions of a subsequent one of the operations meet the subsequent state.

14. The system of claim 11, wherein the method further comprises:
performing a collision check to determine whether the sequence of the operations is feasible; and
responsive to determining that the sequence of the operations is not feasible: regenerating a new sequence of operations based on the one or more preconditions and the one or more effects of the plurality of motion primitives, the target state, and the initial state of the plurality of workpieces.

15. A non-transitory, computer readable medium storing instructions which, when executed by a processor, cause the processor to perform a method for controlling a robotic arm to manipulate a plurality of workpieces, wherein the method comprises:
predefining a plurality of motion primitives of the robotic arm, each of the plurality of motion primitives comprising one or more preconditions and one or more effects;
acquiring a target state of the plurality of workpieces, wherein the target state comprises relative connections between at least a subset of the plurality of workpieces;
acquiring an initial state of the plurality of workpieces, wherein the initial state comprises connection types for at least the subset of the plurality of workpieces;
determining if the connection types for at least the subset of the plurality of workpieces are compatible with each other before performance of operations; and
generating a sequence of operations based on the one or more preconditions and the one or more effects of the plurality of motion primitives, the target state and the initial state of the plurality of workpieces, wherein generating the sequence of the operations is performed in a way that every precondition of a starting one of the operations meets the initial state of the plurality of workpieces and every effect of a last one of the operations meets the target state of the plurality of workpieces;

wherein the operations are selected from the plurality of motion primitives;

wherein the initial state of the plurality of workpieces further comprises locations of the plurality of workpieces, and relative positions and relative connections between the plurality of workpieces, and the sequence of operations is generated based on the locations of the plurality of workpieces, and the relative positions and the relative connections between the plurality of workpieces in the initial state;

wherein execution of the sequence of operations is capable of changing the plurality of workpieces from the initial state to the target state, including connecting at least the subset of the plurality of workpieces according to the relative connections in the target state and the connection types.

16. The non-transitory computer readable medium of claim 15, wherein the generating the sequence of the operations based on the one or more preconditions and the one or more effects of the plurality of motion primitives, the target state and the initial state of the plurality of workpieces comprises:

generating the sequence of the operations in such a way that:

every precondition of a start one of the operations meets the initial state of the plurality of workpieces; and every effect of a last one of the operations meets the target state of the plurality of workpieces; and one or more effects of a previous one of the operations is capable of changing the plurality of workpieces from a previous state to a subsequent state, wherein one or more preconditions of a subsequent one of the operations meet the subsequent state.

17. The non-transitory computer readable medium of claim 15, wherein a state of a prototype corresponding to the target state of the plurality of workpieces is identified, the state of the prototype comprising relative positions and relative connections between workpieces of the prototype;

the sequence of operations is generated based on the relative positions and relative connections between workpieces of the prototype.

* * * * *